(12) United States Patent
Goodisman

(10) Patent No.: US 6,330,006 B1
(45) Date of Patent: Dec. 11, 2001

(54) METHOD AND APPARATUS FOR SYNCHRONIZING AN APPLICATION'S INTERFACE AND DATA

(75) Inventor: Aaron Goodisman, Watertown, MA (US)

(73) Assignee: Silverstream Software, Inc., Billerica, MA (US)

( * ) Notice: Subject to any disclaimer, the term of this patent is extended or adjusted under 35 U.S.C. 154(b) by 0 days.

(21) Appl. No.: 09/076,921

(22) Filed: May 12, 1998

(51) Int. Cl.[7] .............................. G06F 3/00; G06F 9/445
(52) U.S. Cl. ...................... 345/762; 345/764; 709/313; 709/331; 709/332
(58) Field of Search ................................ 345/335, 339, 345/346, 348, 970, 744, 764, 769, 804, 835, 846, 762; 395/682–683, 685; 709/302–303, 305, 313–315, 318, 328, 331, 332

(56) References Cited

U.S. PATENT DOCUMENTS

| | | | |
|---|---|---|---|
| 5,551,035 | * 8/1996 | Arnold et al. ...................... 709/303 |
| 5,574,843 | * 11/1996 | Gerlach, Jr. ...................... 345/348 X |
| 5,608,909 | * 3/1997 | Atkinson et al. ................ 709/303 X |
| 5,634,124 | * 5/1997 | Khoyi et al. ...................... 709/315 X |
| 5,740,439 | * 4/1998 | Atkinson et al. ..................... 709/320 |
| 5,872,973 | * 2/1999 | Mitchell et al. ...................... 709/332 |
| 5,940,494 | * 8/1999 | Rafacz et al. ..................... 345/335 X |
| 5,984,502 | * 11/1999 | Calder ............................... 345/339 X |
| 6,026,238 | * 2/2000 | Bond et al. ....................... 709/302 X |
| 6,072,493 | * 6/2000 | Driskell et al. .................. 345/346 X |
| 6,154,786 | * 11/2000 | Williamson et al. ................ 709/315 |

OTHER PUBLICATIONS

Douglas C. Schmidt et al., "Measuring the Performance of Parallel Message–based Process Architectures", IEEE, pp. 624–633, 1995.*

* cited by examiner

Primary Examiner—Raymond J. Bayerl
Assistant Examiner—X. L. Bautista
(74) Attorney, Agent, or Firm—The Hecker Law Group

(57) ABSTRACT

Embodiments of the invention comprise a method and apparatus for synchronizing interface objects of an application's graphic user interface (GUI) with underlying data. A design tool is used in embodiments of the invention to specify an interface object's binding properties. Data binding properties can define an association between an interface object and underlying data for synchronization purposes. In addition, a validation binding can be specified for an interface object that can be used to validate the data entered via the interface object. An expression binding associates an interface object to a plurality of interface objects and/or underlying data sources that contain data used in evaluating an expression the result of which is displayed in the interface object. A query expression binding associates a plurality of interface objects and/or underlying data sources and to an evaluatable expression the result of which is used in a query to retrieve a data source's data. A binding manager manages the bindings (e.g., data, expression and validation bindings) defined at design time or at run time. Further, the binding manager registers with the program code (e.g., instances of object classes) that manages the bound interface objects and underlying data. The binding manager is notified, when a change occurs to an interface object or the underlying data. The binding manager processes the change request to ensure that bound interface objects and/or data sources remain synchronized.

28 Claims, 9 Drawing Sheets

METHOD AND APPARATUS FOR SYNCHRONIZING AN APPLICATION'S INTERFACE AND DATA

BACKGROUND OF THE INVENTION

1. Field of the Invention

This invention relates to an application interface and, more specifically to synchronizing an application's graphical user interface and data.

2. Background Art

Software applications designed to run on computer systems allow an application user to manipulate data associated with an application. For example, an accounting application allows a user to manipulate accounting information. A graphical user interface (GUI) is typically designed for a software application that allows an application user to enter and update application data.

In the past, an application such as an accounting application was required to include program code to synchronize an interface object (e.g., a text field) of the application's GUI with the underlying data that was used to initialize the interface object. The developer of the application's program code had to generate code that updated an interface object with the underlying data. That is, the application developer generated program code configured to retrieve the data from its data source, provide the data to the interface object, and propagate changes entered in the interface object to the data's storage location in the data source. If the application program did not include this program code, an interface object and its underlying data could become asynchronous.

In developing the application's program code, an application developer must be cognizant of the interface objects and/or data sources that are affected by each change. Otherwise, the application programmer may fail to include program code that propagates a change. In this case, an interface object and data source will not be synchronized. This can result in erroneous data being displayed in the interface object, or a data update that is entered in an interface object not modifying the underlying data.

Another issue of synchronization occurs where an interface object displays the result of an expression that must be evaluated whenever a change occurs to an operand of the expression. For example, where an expression is evaluated using data from one or more interface objects or underlying data sources, an application's program code must be configured to recognize when a change occurs to any of the interface objects or data sources that affect the expression. In developing the application's program code, the application programmer must therefore generate program code to recognize a change and re-evaluate the expression when a change occurs. If the application program fails to recognize when a change occurs, the interface object that display's the expression's result can display erroneous data.

The application may require that a change that occurs in an interface object be validated before it is written to a data source. In the past, an application programmer must generate program code that ensures that the validation is performed prior to updating the underlying data. If the application developer fails to include program code configured to validate data, invalid data that is entered in an interface object can update the underlying data. This results in corruption of the underlying data source.

Thus, it is important that an application program be configured to ensure that interface objects in the application program's GUI and underlying data remain synchronized and valid. The trust in application software is dependent on synchronizing the application program's GUI and its underlying data, and ensuring that the underlying data is valid. Unfortunately, there is a potential for error where an application programmer is required to write code to ensure that all of the dependencies between an application program's GUI interface objects and underlying data remain in sync and that data is validated before it is written to the underlying data source.

SUMMARY OF THE INVENTION

Embodiments of the invention comprise a method and apparatus for synchronizing interface objects of an application's graphic user interface (GUI) with underlying data. A design tool is used in embodiments of the invention to specify an interface object's binding properties. Data binding properties can define an association between an interface object and underlying data for synchronization purposes. In addition, a validation binding can be specified for an interface object that can be used to validate the data entered via the interface object. An expression binding associates an interface object to a plurality of interface objects and/or underlying data sources that contain data used in an expression the result of which is displayed in the interface object. A query expression binding associates a query expression to a plurality of interface objects and/or underlying data sources that contain data used in an expression the result of which is used in a query to retrieve a data source's data.

The design tool used in embodiments of the invention generates program code that expresses the binding properties defined using the design tool. As program code, the bindings are exposed for review and modification. For example, the application's program code can modify the bindings at run time. Thus, it is possible to modify the bindings generated by the design tool via application program code.

A binding manager manages the bindings (e.g., data, expression and validation bindings) defined at design time or at run time. Further, the binding manager registers with program code (e.g., instances of object classes) that manages bound interface objects (e.g., a control object) and underlying data (a dataSource object). When a change occurs to an interface object, its control notifies the binding manager. A change may occur in an interface object when a user enters a new value in the interface object or the value displayed in the interfaced object is changed programmatically (e.g., by program code), for example.

Similarly, when a change occurs to a data item in a data source, its dataSource notifies the binding manager. A change occurs to a data item when application program code modifies the data item, for example. A change may also occur to a data item when a request is made to fetch a new record from the data source.

In response to a change notification involving a data binding between an interface object and a data source's data item, the binding manager propagates the change between the interface object and the data source. If a validation binding exists for the interface object, the binding manager invokes validation processing to determine whether the interface object's new value is valid and can be written to the data source.

The binding manager listens for changes made to interface objects and/or data source data items that are used as operands in an expression. When such a change notification is received, the binding manager causes the expression to be re-evaluated and the result to be propagated to the necessary interface object and/or data source.

The binding manager further listens for changes made to interface objects and/or data source data items that are used to evaluate a query expression. When such a change notification is received, the binding manager causes the query expression to be re-evaluated. The result of the query expression is used in a query to retrieve information (e.g., rows) from a data source.

DETAILED DESCRIPTION OF THE INVENTION

A method and apparatus for synchronizing an application's interface and data is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiment of Computer Execution Environment (Hardware)

Figure 1:
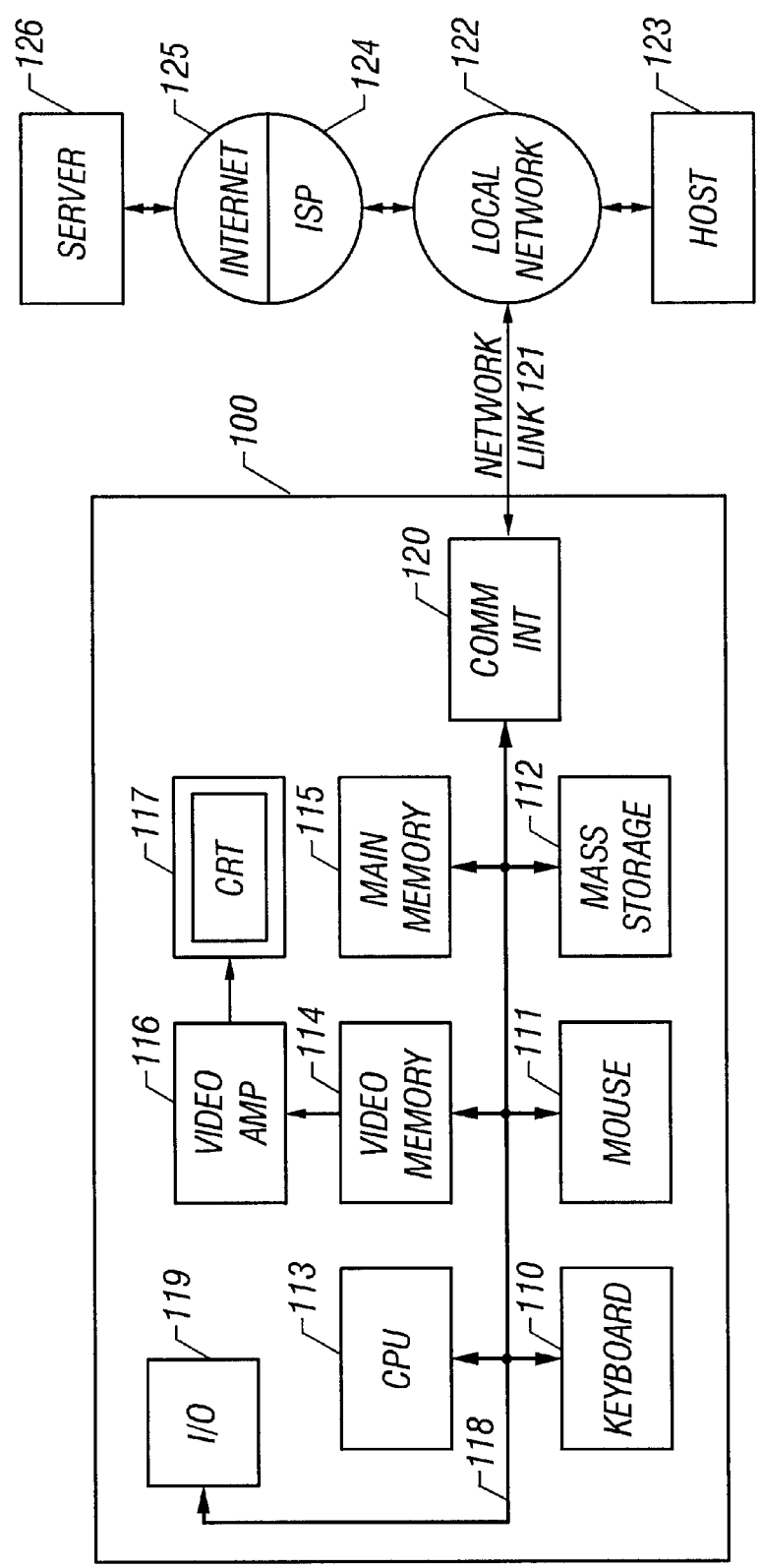
FIG. 1 provides an example of an embodiment of a computer execution environment suitable for executing embodiments of the invention.

An embodiment of the invention can be implemented as computer software in the form of computer readable code executed on a general purpose computer such as computer 100 illustrated in FIG. 1, or in the form of bytecode class files executable within a Java™ runtime environment running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor, or a SPARC™ microprocessor from Sun Microsystems™, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Alternatively, video memory 114 could be used to drive a flat panel or liquid crystal display (LCD), or any other suitable data presentation device. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem or cable modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Design-Time Binding

Embodiments of the invention comprise a mechanism for binding (or associating) and synchronizing data of a data source with an interface object of an application interface. Embodiments of the invention can further be used to bind, or associate, an interface object to an expression or a validation expression. A binding can be defined at design time (e.g., when the application interface is being created), or may be specified at run time (e.g., by application code executing in a computer system).

Embodiments of the invention retain binding information and synchronize the information displayed in an interface object and the data item contained in a data source when one of them is changed. A binding is used to ensure that a change in an interface object's information is propagated to the data item and vice versa.

A design tool is used in embodiments of the invention to facilitate an interface designer in specifying a binding (e.g., binding an interface object and a data source's data item). One example of a data source is a relational database table. Data sources are not limited to database tables, however. A data source that has identifiable rows (or records) and columns (or fields) within a row can be used to bind to an interface object according to embodiments of the invention.

Columns in a data source are typically grouped into rows or records. Embodiments of the invention allow different patterns of columns across rows in a single data source. That is, for example, two rows in the same data source can comprise a different number of columns and/or different column definitions (e.g., column lengths and data types).

Figure 2:
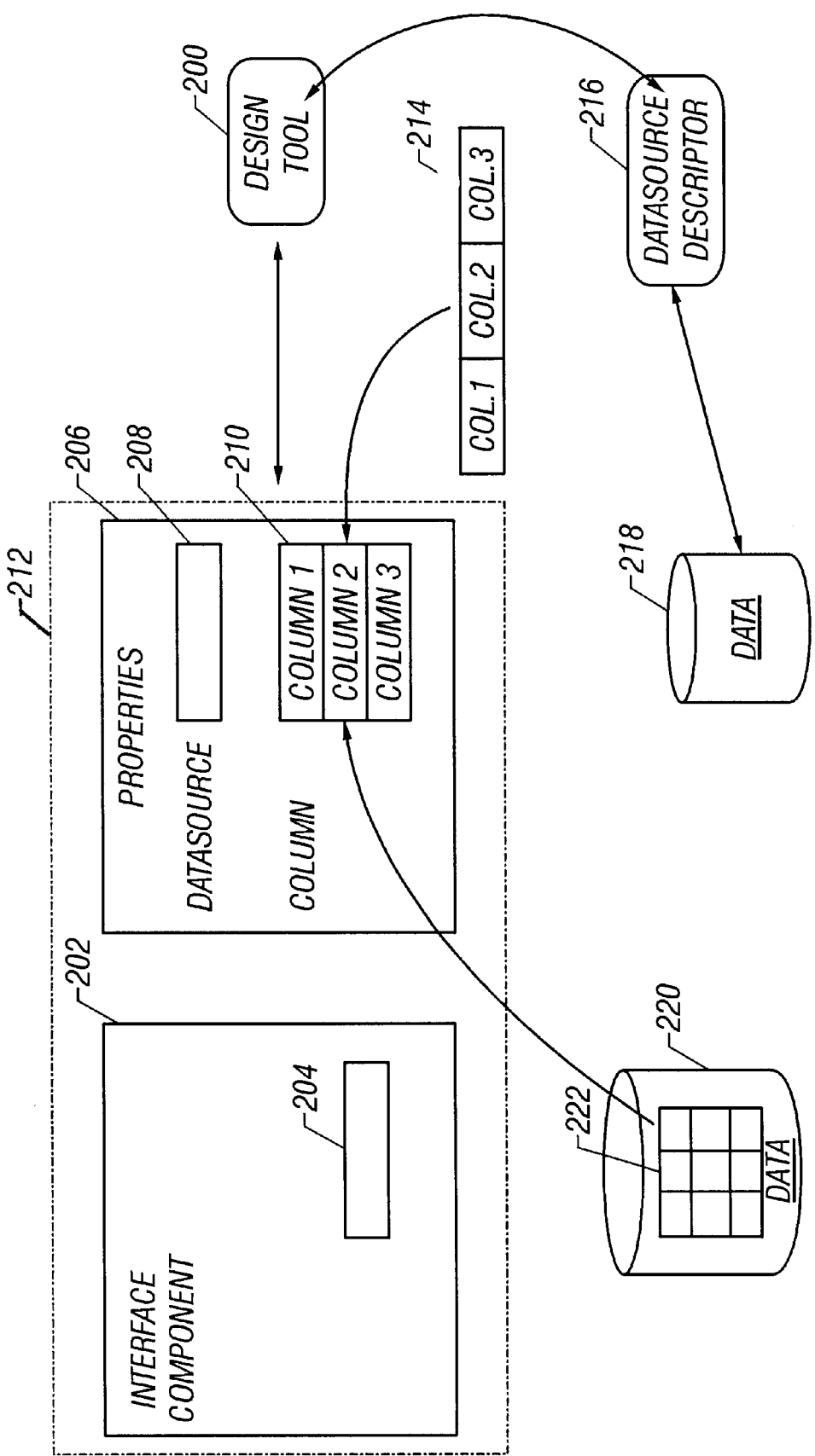
FIG. 2 represents a design tool environment for specifying a binding according to embodiments of the invention.

FIG. 2 represents a design tool environment for specifying a binding according to embodiments of the invention. Designer interface 212 includes interface component 202 and properties display 206. Interface component 202 includes interface object 204. An interface object can be, for example, a text field (read-write or read-only), a button, a list, etc. An interface designer specifies the interface objects that are contained in interface component 202. The interface designer can select an icon (not shown) that represents an interface object and drag it onto interface component 202, for example. An instance of the interface object is created and displayed in interface component 202.

Further, an interface designer can specify properties for an interface object. One such property identifies the underlying data that is tied, or bound to an interface object. The tie between underlying data and an interface object is referred to as a binding. By binding an interface object to underlying data, the interface designer identifies an association that is used in embodiments of the invention to propagate changes between the interface object and the underlying data.

To specify a binding for interface object 204, according to an embodiment of the invention, the interface designer can select interface object 204 (e.g., by clicking on interface object 204). Properties display 206 is displayed in response to the selection of interface object 204. Properties display 206 may contain other properties in addition to a bind property. The properties available for specification in properties display 206 may be dependent on the type of interface component. For example, if interface component 204 is a text field, properties display 206 can further include a font properties.

The bind property for an interface component can vary as well. For example, different types of bindings can be specified for an interface component. A binding between an interface component and underlying data is referred to as a data binding. Examples of other bindings include expression binding, query expression binding and validation binding.

An expression binding binds an interface object to an evaluatable expression. An expression can have multiple operands separated by operators where an operand of the expression may be an interface object, underlying data, functions (e.g., functions that have zero or more arguments) or a constant, for example. Operands that are other interface objects or underlying data are bound to the interface object that is bound to the expression.

A validation expression can be bound to an interface object. A validation expression is used to ensure data entered into an interface object is valid and can be written to the underlying data, for example. A validation expression returns either a "true" or "false" result. A "true" result is returned, if the data is valid and a "false" result otherwise.

Interface object 204 can be bound to different types of underlying data. One type of underlying data, or data source, is a table in a relational database management system (DBMS). Another example of a data source is a file in a file system. Stock quotes received from via a modem connection to an online provider is another example of a data source.

Design tool 200 may be aware of the structure for some of the data sources (e.g., database tables). Data source 220 is an example of a database that includes database table 222 whose structure is known by design tool 200. Embodiments of the invention provide a mechanism, data descriptor 216, whereby data whose structure is not previously known to design tool 200 can be determined by design tool 200. DataSource descriptor 216 is a software component (e.g., an instance of an object class in an object-oriented programming environment).

Data source 216 is an example of a data source whose structure is not known by design tool 200. DataSource descriptor 216 includes an application programming interface (API) that is known to design tool 200 and contains methods that present a structure for the underlying data to design tool 200. In an embodiment of the invention, structure 214 reflects an expected structure that may or may not be the actual structure of the underlying data. For example, data descriptor 216 specifies a row and column structure for the underlying data. The underlying data may be a continuous stream of data, for example.

Data descriptor 216's API includes methods that allow design tool 200 to request information about the structure. For example, design tool 200 can request the number, type and names associated with the data columns. Further, as will be discussed in more detail below, a type can be associated with a row which can be retrieved using data descriptor 216's API. This is used where different row types exist in a data source.

In an embodiment of the invention, design tool 200 can query a user for data structure information. That is, the user is presented with a user interface (UI) that allows the user to specify the structure of the data (e.g., column names and types), even if the data source itself is not capable of such description. This referred to as "soft binding" because the particular data source might provide different data in different uses. However, the user of design tool 200 might know about the data that will be provided by this particular reference to the data source.

Referring to properties display 206, the interface designer specifies a data source (e.g., data source 318) using input 208. Input 208 can be a pull-down menu that contains an identifier for a data source. For example, a name of table 222 can be displayed in input 208. DataSource descriptor 216 can communicate with design tool 200 to supply a name for data source 218 that can be displayed in input 208.

Input 210 displays column information for a data source selected using input 208. Input 210 is, for example, a pull-down menu, that contains a listing of the columns for the selected data source. Input 210 can be other types of interface objects such as a pop-up dialog. To specify a data binding, the interface designer selects a column to bind to interface object 204.

Design tool 200 generates a binding statement to reflect the data binding. An example of a data binding statement, according to an embodiment of the invention, is as follows:

bind(control, data source, column)

The statement identifies a control that generates interface object 204, a data source that provides an interface to the underlying data and a data item (i.e., a column) in the underlying data. Design tool 200 generates a definition for an interface component object for interface component 202. Interface component 202 can be a form, for example. A form is a self-contained presentation element with predefined areas for displaying, entering and/or changing data.

Run-Time Binding

The bind statement is included in the interface component object as a call to a method that registers the binding. At runtime the bind statement causes a bind method in a binding manager to be invoked. The bind method stores the information and causes the binding manager to register with the referenced control and data source. The bind statement can be generated at design time as described above. However, since a bind statement is used to specify a binding and invoke a method of a binding manager, a binding can be modified at run-time as well. That is, a bind method can be invoked to modify binding information (e.g., specified in a bind statement generated at design time) retained by the binding manager. Thus, a binding can be modified dynamically at run time.

Figure 3:
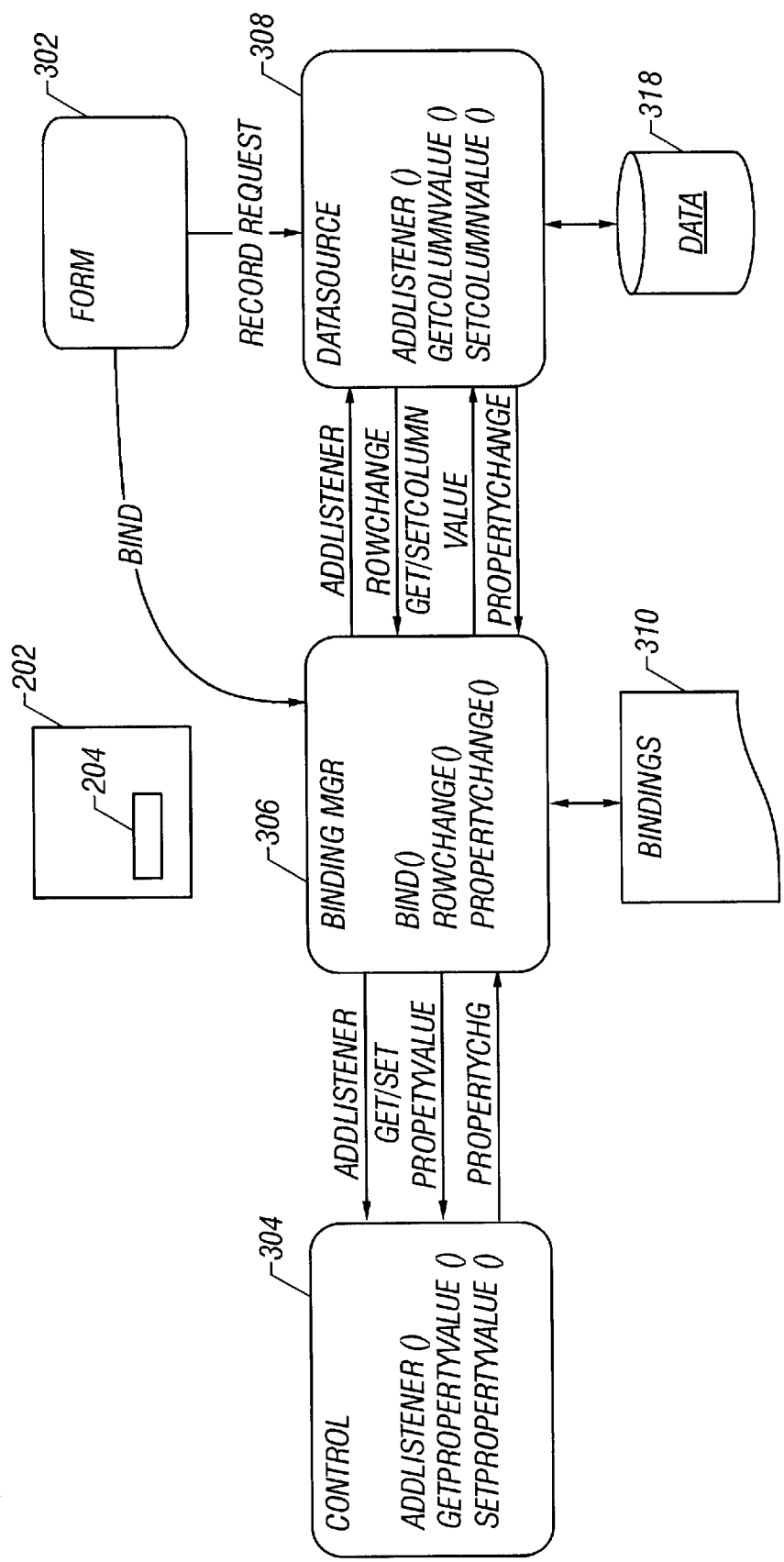
FIG. 3 illustrates a run time binding environment according to an embodiment of the invention.

FIG. 3 illustrates a run time binding environment according to an embodiment of the invention. Control 304 controls interface object 204. For example, control 304 generates the display for interface object 204 using the properties defined for the interface object 204 at design time. The current value for interface object 204 is loaded into the display by control 304. Interface object 204 is included in interface component 202. Form 302 manages interface component 202. Form 302 includes a bind statement that includes a set of parameters that identify a data item (e.g., a column) in data 318 to synchronize with interface object 204. That is, the bind statement binds control 304 with dataSource 308 and identifies a column in data 318 that contains the data used to populate interface object 204.

The bind statement in form 302 causes a bind method to be invoked on binding manager 306. While names are associated with methods described herein, it should be apparent that different names can be used with embodiments of the invention. Binding manager 306 stores the parameter information contained in the bind statement in bindings 310. Binding manager 306 further invokes an addListener method in control 304 and dataSource 308 to register as an interested listener for changes that involve interface object 204 and the data item in data 318 that is bound to interface object 204.

As a result, control 304 and dataSource 308 notify binding manager 306 when a change occurs in interface object 204 or data 318, respectively. If, for example, the user enters a value in interface object 204, control 304 invokes the propertyChange method of binding manager 306, as a registered listener of control 304. Binding manager 306 examines bindings 310 to determine whether there are any bindings that identify control 304. If control 304 is bound to a data item (e.g., a column) of data 318, a data binding exists in bindings 310 that identifies dataSource 308. Binding manager 306 invokes a getPropertyValue method of control 304 to get the value (or property) of interface component 204. Binding manager 306 invokes a setColumnValue method of dataSource 308 to set the new value for the bound data item of data 318.

DataSource 308 can notify binding manager 306 of a change as well. A property change can occur to the bound data item in data 318 that is bound to interface object 204. For example, a change can be made programmatically to the data item in data 318. Further, a change can occur when a new record is requested from dataSource 308. For example, form 302 can request the next record when a "next record" button (not shown) is selected in interface component 202. When either a row or property change occurs, dataSource 308 notifies binding manager 306, as a registered listener of dataSource 308.

When a property change occurs, dataSource 308 invokes a propertyChange method of binding manager 306. Binding manager 306 examines bindings 310 to determine which, if any, controls are affected by the property change. If a control (e.g., control 304) is bound to the changed property, binding manager 306 invokes the getColumnValue method of dataSource 308 to get the changed value. The changed value is sent to control 304 via the setPropertyValue method of control 304. Control 304 sets the new value in interface object 204.

A row change can have multiple columns and, therefore, can affect multiple interface objects. To synchronize the affected interface objects with the new row, binding manager 306 performs a synchronization for each of the columns that is similar to a property change to a single data item in data 318. That is, for each column in the row, binding manager 306 synchronizes the column with each of its bound interface objects. Binding manager 306 determines whether each of the row's columns is bound to an interface object's control. If so, binding manager 306 gets the column value from dataSource 308 and invokes the setpropertyValue for each of the column's bound controls.

A data binding can be used to propagate changes to data between interface objects and data sources. A data binding is typically used to synchronize changes in a data source's item with an interface object in which data can be entered (i.e., a read-write interface object). A binding can also be defined for an interface object that is read-only. That is, an interface object that displays information, but does not allow the information to be overwritten by a user. The information that is displayed in a read-only interface object may be the result of an expression that is evaluated at run time. An expression binding can be used to bind the read-only interface object with data items and other interface objects referenced in the expression.

Expression Binding

The value displayed an interface object can be the result of an expression that operates on data such as that displayed in other interface objects, stored in one or more data sources, functions, or constant values. Embodiments of the invention comprise a mechanism for binding the interface object to these expression operands. When a change occurs to a bound interface object or data item, the expression is re-evaluated and the result is placed in the interface object.

An expression binding is registered with binding manager 306. Binding manager 306 registers with the bound controls and/or data sources. When binding manager 306 is notified of a change, binding manager 306 gets the values from each data source and interface object and invokes an expression evaluator to re-evaluate the expression and generate a result. The result is used to update the interface object by invoking the setValue method of the interface object's control.

An expression binding can be defined at design time or, programmatically, at run time. At design time, design tool 200 can be used to specify the expression. References to data sources and/or interface objects can be specified using properties 206. When code is generated for interface component 202, a method (e.g., evaluateExpressionX) is generated to evaluate the expression. When a change occurs to one of the referenced controls or data in a data source, binding manager 306 invokes the evaluateExpressionX method. The result is returned to binding manager 306 which invokes a setValue method of the control to set result in the interface object. Examples of binding statements that are generated in an embodiment of the invention are as follows:

bind(control, expressionX)
expDependency(expressionX, control or dataSource)

The bind statement identifies the control and an identifier for the expression (e.g., a unique number appended to the word "expression"). The expression identifier uniquely identifies the expression and is also used to identify the statements that evaluate the expression. An expression evaluator can be a method in the program code associated with the interface component, for example. In this case, the expression identifier can become part of the method name so as to uniquely identify the method. Alternatively, one method can be used to evaluate expressions. In this case, the expression is identified when the method is invoked.

One or more dependency statements are used to bind the expression to the control(s) and or data source(s) that are referenced in the expression. The bind and dependency statements can be generated at design time for those expression bindings that are defined at design time.

The bind and dependency statements invoke methods of binding manager 306. The bind method of binding manager 306 results in a binding between the control that manages the interface object that displays the result of the expression and the expression identifier. The dependency statement binds the expression identifier to a control or data source. There is a dependency statement for each control or data source that is an operand of the expression.

Thus, binding manager 306 maintains a list of dependencies (e.g., a control or a data source's data item) for an expression. When one of the dependencies changes, binding manager 306 invokes the expression evaluator (e.g., evaluateExpressionX) to re-evaluate the expression with the changed value(s) and update the read-only control.

Figure 4:
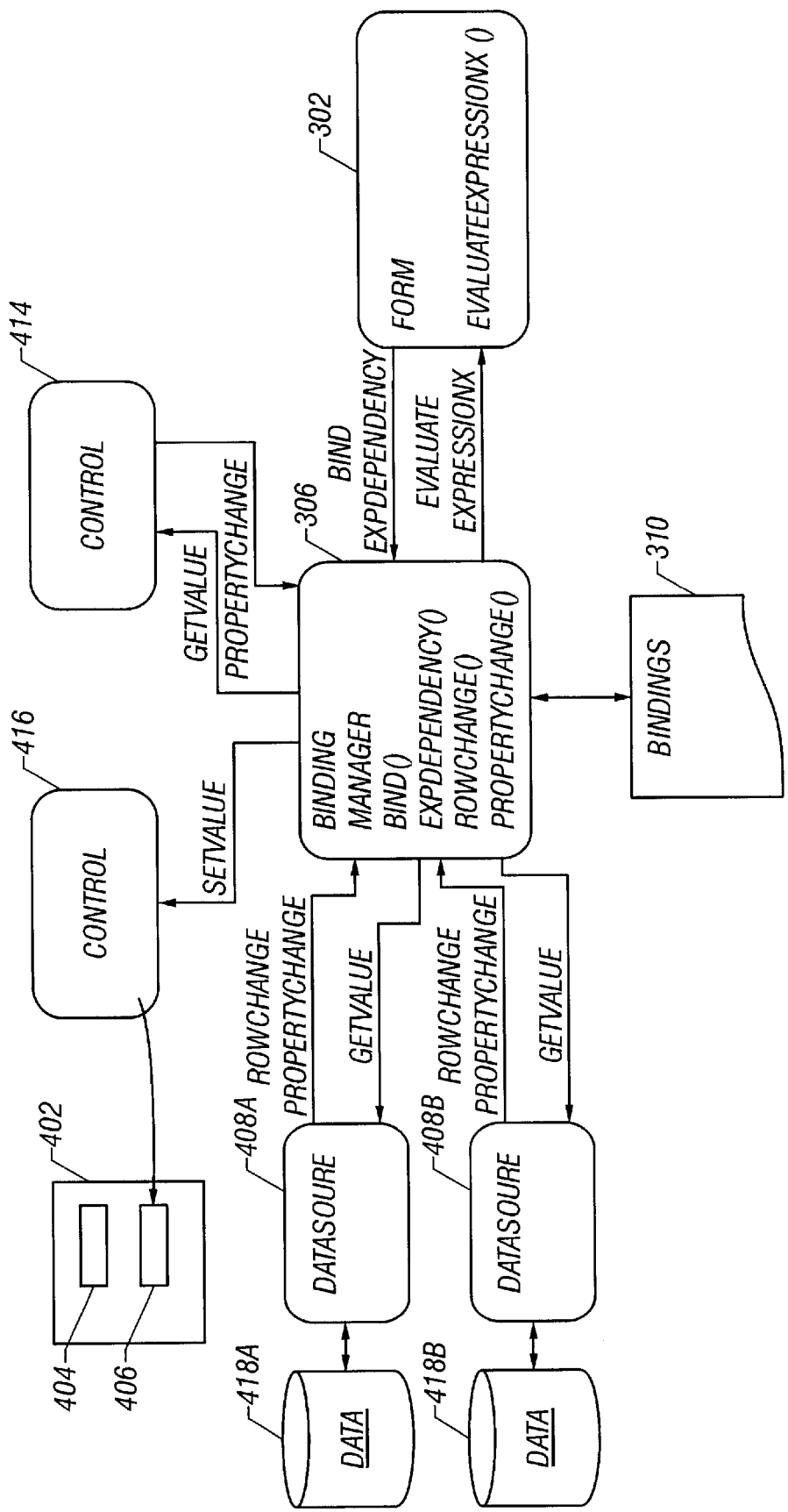
FIG. 4 provides an example of a run time expression binding environment according to an embodiment of the invention.

FIG. 4 provides an example of a run time expression binding environment according to an embodiment of the invention. Interface object 406 displays a value that is the result of an expression. The expression uses data from interface object 406 and data 418A and 418B. Bind and dependency statements are added in form 302's program code. The statements bind interface object 406's control 416 with the expression and identify the expression's dependencies. Examples of the bind and dependency statements, according to an embodiment of the invention, are as follows:

bind(control 416, expression1)
expDependency(expressionl, control 414)
expDependency(expressionl, dataSource 408A)
expDependency(expressionl, dataSource 408B)

The bind statement binds interface object 406's control 416 to the expression. The expDependency statements bind the expression to the control (i.e., control 414) and dataSources (i.e., dataSources 408A and 408B) that manage the expression's operands.

The bind and expDependency statements of form 302 are configured to invoke the bind and expDependency methods of binding manager 306 to register the binding information for the expression. The expression's binding information is stored in bindings 310 by binding manager 306.

Binding manager 306 registers with control 414, dataSource 408A and dataSource 408B as the expression's dependencies. Control 414, dataSource 408A and dataSource 408B notify binding manager 306 when a change occurs (e.g., a row or property change). Upon notification of a change, binding manager 306 examines bindings 310 to identify control 414, dataSource 408A and dataSource 408B. Binding manager 306 invokes the getValue methods of control 414, dataSource 408A and dataSource 408B to get the data values. Binding manager 306 invokes the expression evaluator (e.g., the evaluateExpressionX method) of form 302. The returned value is sent to interface object 406 via the setValue method of control 416. Control 416 updates interface object 406 with the result.

If the change notification received by binding manager 306 is a row change, binding manager 306 examines bindings 310 for each column in the row. Binding manager 306 determines whether there are any interface objects that are bound to an expression that references a column in the row. For each column that is referenced, binding manager 306 causes the expression to be re-evaluated with the column's value in the new row.

Validation Binding

Before writing a value to the data source, the value is typically examined to determine whether it is a valid value. A validation rule can be expressed, in embodiments of the invention, as part of the properties specified for an interface object. Before writing a new value to the data source, the validation rule associated with the interface object is evaluated to determine whether the value is valid. If the validation rule is evaluated as "true", the value is valid and is written to the data source. If the evaluation is "false", the value is invalid and an error message can be generated in the application interface.

A validation binding can be defined at design time or, programmatically, at run time. At design time, design tool 200 can be used to specify a validation expression in properties 206, for example. An association is made between the interface object's control and an identifier that uniquely identifies the validation expression (e.g., expressionX). When code is generated for interface component 202, a method (e.g., validateExpressionX) is generated to validate a value before it is written to a data source. Binding manager 306 is notified when a change occurs to the value of an interface object. Binding manager 306 invokes the validateExpressionX method for the new value. The validateExpressionX method returns either a "true" or a "false" result.

Examples of a validation expression binding statement used in an embodiment of the invention to bind a interface object's control with a validation expression is as follows:

bindValidation(control, validationExpressionX)

The bindValidation statement is program code that is included in the interface component's object instance (e.g., form 302). It is configured to invoke a bindValidation method in binding manager 306.

Figure 5:
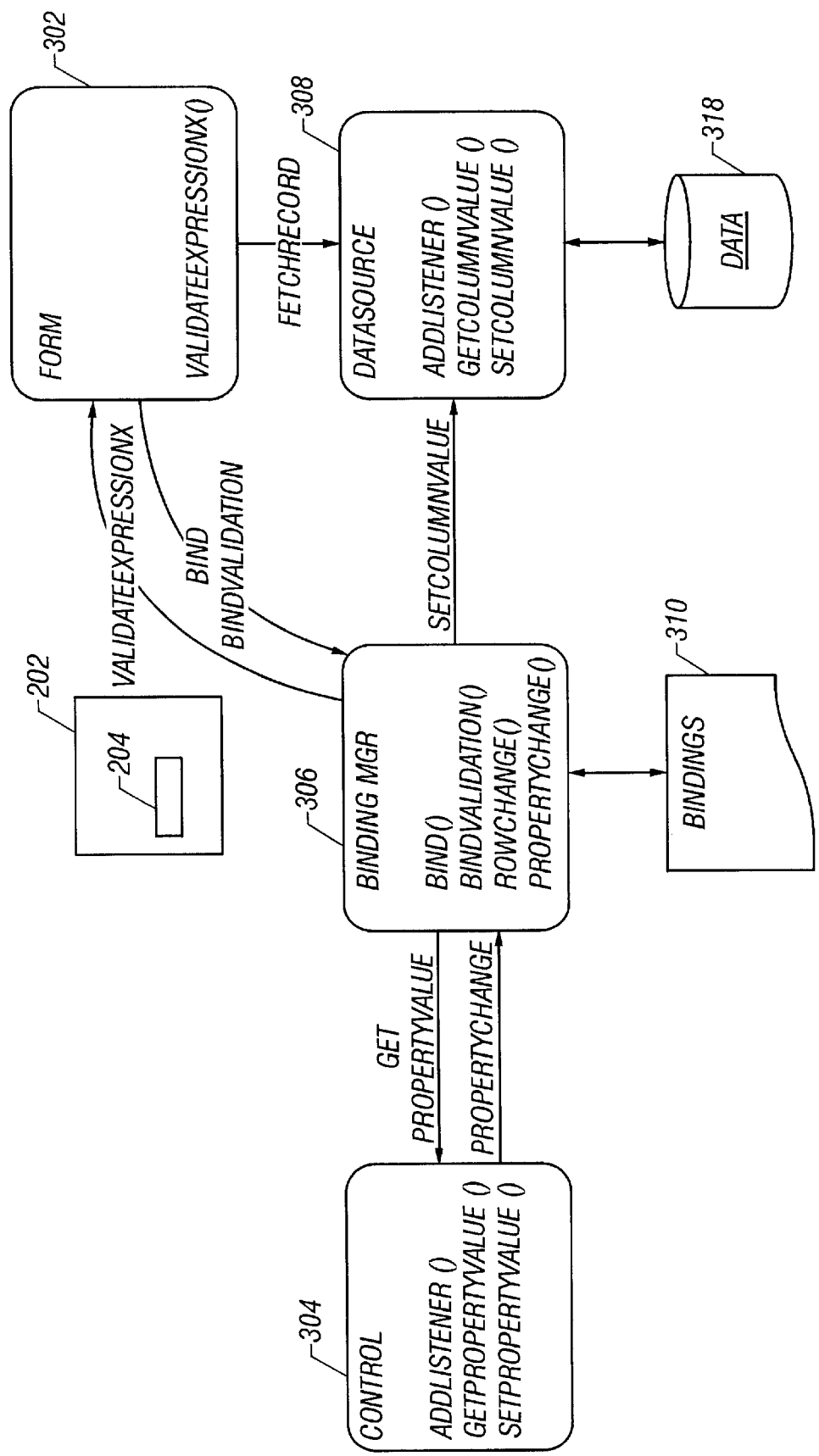
FIG. 5 provides an example of validation binding environment according to an embodiment of the invention.

FIG. 5 provides an example of validation binding environment according to an embodiment of the invention. Interface object 204 is bound to a validation expression. Form 302 includes an expression binding statement configured to invoke the bindValidation method of binding manager 306. The expression binding statement identifies control 304 of interface object 204 and the validation expression (e.g., using expressionX). Form 302 typically also includes data binding statements to bind control 304 (for interface object 204) to dataSource 308 (for a data item of data 318) via an invocation of the bind method of binding manager 306. Binding manager 306 stores the binding information in bindings 310.

Binding manager 306 registers with control 304 and dataSource 308. When the value displayed in interface object 204 changes, control 304 invokes the propertyChange method of binding manager 306, as a registered listener of control 304. In response, binding manager 306 retrieves the binding information from bindings 310. Binding manager 306 retrieves the new value from control 304 via a getPropertyValue method.

Binding manager 306 invokes the validateExpressionX method of form 302 to validate the new value. If a "true" result is returned, binding manager 306 instructs dataSource 308 to update the bound data item in data 318 by invoking the setColumnValue method of dataSource 308. If a "false" result is returned, binding manager 306 does not invoke the setColumnValue method. Instead, an error message can be displayed in interface component 202.

DataSource APIs and Bands

As described above, dataSource descriptor 216 includes an API comprising methods configured to supply structural information about the data that is bound to an interface object. Alternatively, dataSource 308 can implement dataSource descriptor 216's API and interact with, design tool 200, at design time to provide the structure of data 318.

DataSource 308 also implements a RowCursor interface that is used at run time to iterate through rows of data. The RowCursor interface methods return a row of information at a time to a requester and maintain a counter that identifies the current row.

A row is comprised of a plurality of columns. Embodiments of the invention provide a mechanism for different types of rows in the same data source. For example, one or more rows can have a different patterns of columns than another row in the data source. For example, the number of columns (or fields) and/or a column's definition (e.g., data type and length) may differ from another row.

To facilitate different rows in a data source, a type is assigned to a row that has a given pattern. Rows that have the same pattern are considered to be the same type. A row type is also referred to as a band. Rows within a given band have the same column pattern. Each band is given a name that is unique within the row cursor. The RowCursor interface includes a getProperty method. The getProperty method returns information associated with a band (e.g., the current row's band). When the getProperty method is invoked and the band name property is requested, the method returns the name of the band for the current row. A getPropertyCount method of the RowCursor interface returns the number of columns in a given band, for example.

For example, a data source can be comprised of a collection of rows that contain information associated with customer contacts. One type of row contains information associated with a request for product assistance (i.e., a support call). Another type of row is associated with a request for product information (i.e., an inquiry call).

Each row in the collection of rows can either reflect customer support information or customer inquiry information. A support call row can include fields that identify the product, the date of the purchase, the customer's identification, etc. An inquiry call row can include fields that identify the budget, a purchase time, a referral source, the customer's identification, etc. The data source can include a customer support band and a customer inquiry band to reflect different patterns of columns.

An application that uses the data source can determine the type of band for the current row by invoking the getProperty method and requesting the band name for the current row (e.g., the customer support band or customer inquiry band). The application can then request the appropriate columns knowing the current row's band.

Since a data source can include different types of rows, a particular column may not be available in the current row. Binding a interface object to a column, in this case, may include both a column designation as well as a band designation. That is, the data binding model described above can be used to bind an interface object to a column within a band. If the current row is from the specified band, there is a well-defined value that can be used for the interface object. If the current row is not from the specified band, a null value can be used for the interface object, for example.

At design time, design tool 200 allows an interface designer to specify a data item within a data source to be used to supply information to populate the display for an interface object. Design tool 200 allows the user to identify the data source and the column within the data source to bind to the interface object. Where multiple bands are included in a data source, design tool 200 allows the user to specify a data source, a band and a column within a band, for example.

Binding Process Flow

Figure 6:
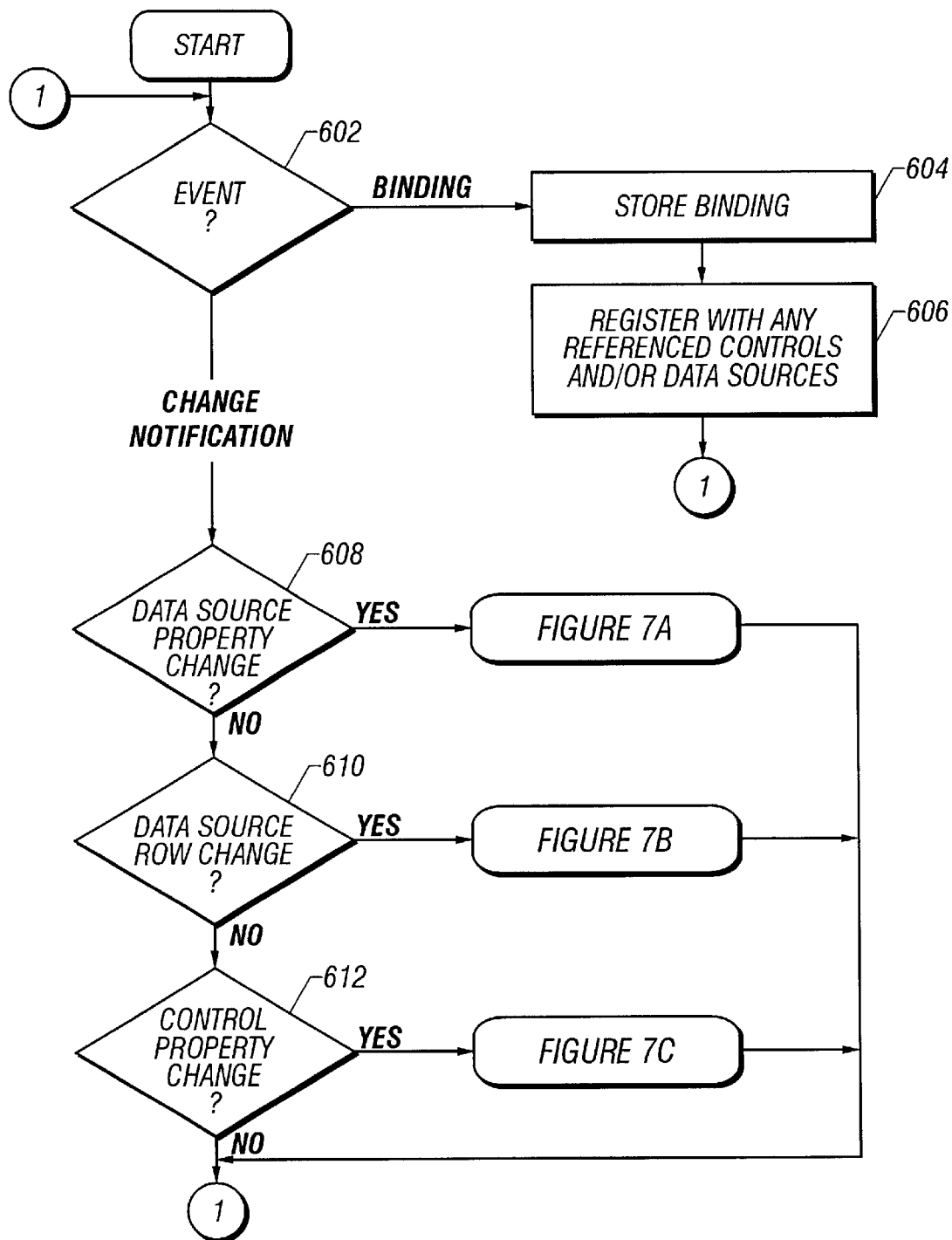
FIG. 6 provides an example of a binding process flow according to an embodiment of the invention.

FIGS. 6 and 7A–7C provide an example of a binding process flow according to an embodiment of the invention. Referring to FIG. 6, binding manager 306 awaits an event (e.g., a binding or change notification). A binding event occurs, for example, when a bind, bindValidation, or expDependency method of binding manager 306 is invoked by form 302. A change notification occurs, for example, when a rowChange or propertyChange method of binding manager 306 is invoked.

If a binding event is received at 602, processing continues at step 604 to store the binding information in bindings 310. Binding manager 306 registers with any referenced controls or dataSources at step 606. Processing continues at step 602 to await another event.

If it is determined, at step 602, that a change event occurs, processing continues at step 608 to handle the change notification. If it is determined at step 608 that the change notification is a change to a data item (i.e., a property or column) in a data source, processing continues at step 702 in FIG. 7A. If it is determined that the change notification is a row change in a data source, processing continues at step 722 in FIG. 7B. If it is determined, at step 608, that the change notification is a property change received from a control, processing continues at step 752 in FIG. 7C.

Figure 7A:
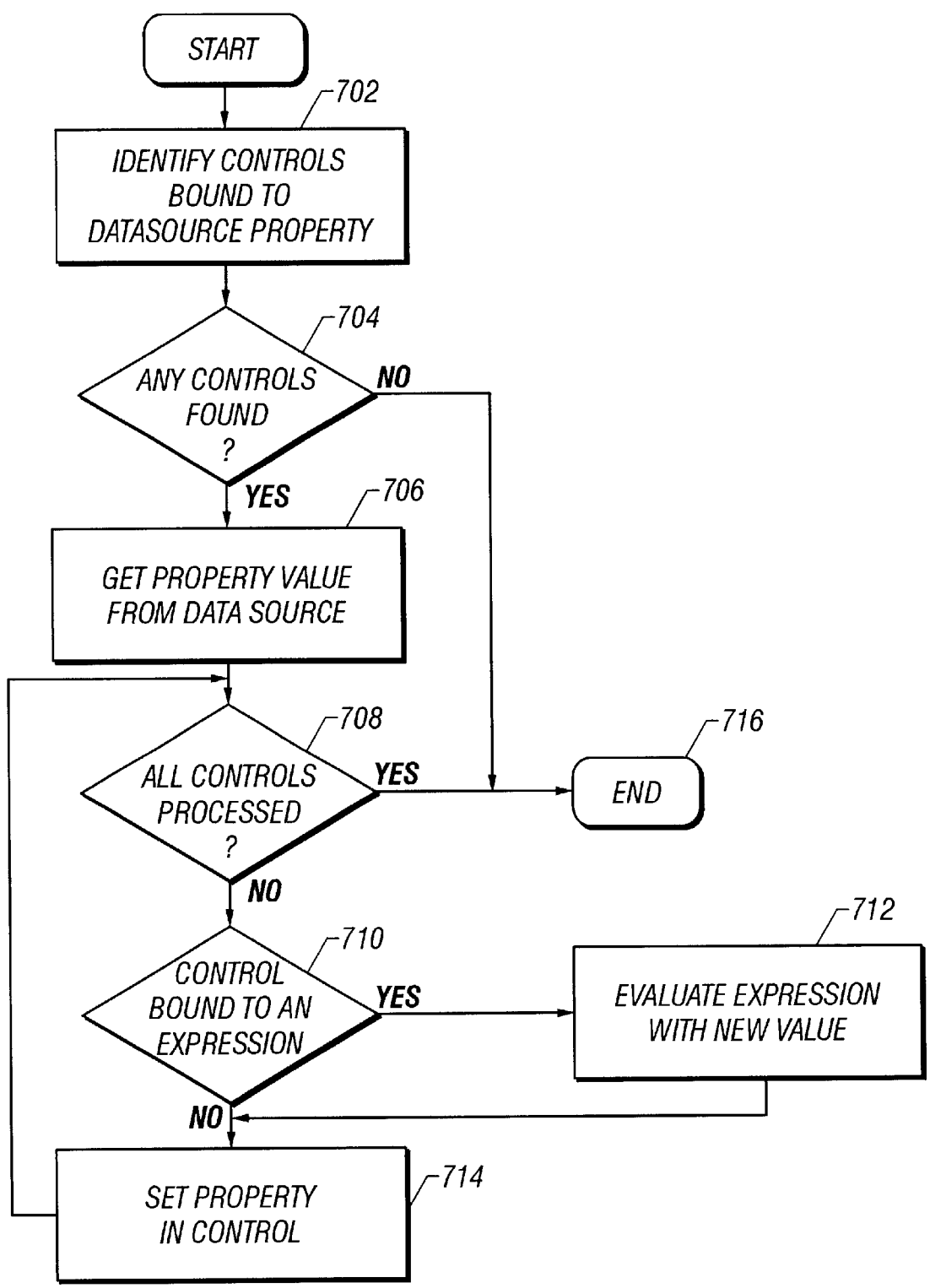
FIG. 7A provides an example of a data source property change process flow according to an embodiment of the invention.

Binding manager 306 propagates a property change in a data source to the interface objects (via its control) that are bound to the changed data item in the data source. FIG. 7A provides an example of a data source property change process flow according to an embodiment of the invention.

At step 702, binding manager 306 examines bindings 310 to identify the controls that are bound to the data source property. At step 704, a determination is made whether any controls are bound to the changed data source property. If not, processing continues at step 602 of FIG. 6 to await another event.

If it is determined, at step 704, that there are controls that are bound to the changed data source data item, processing continues at step 706 to get the data item's (or property's) value from the data source. Binding manager 306 forwards the changed property to each of the bound controls. At step 708, a determination is made whether all of the bound controls have been processed. If so, processing continues at step 602 of FIG. 6 to await another event.

If it is determined, at step 708, that there are bound controls remaining to be processed, processing continues at step 710. At step 710, a determination is made whether the control is bound to an expression. If so, processing continues at step 712 to evaluate the expression using the new property value retrieved from the data source. Processing continues at step 714 to set the result of the expression in the interface object via its control. If it is determined, at step 710, that the interface object's control is not bound to an expression, processing continues at step 714 to set the new value in the interface object via its control.

Figure 7B:
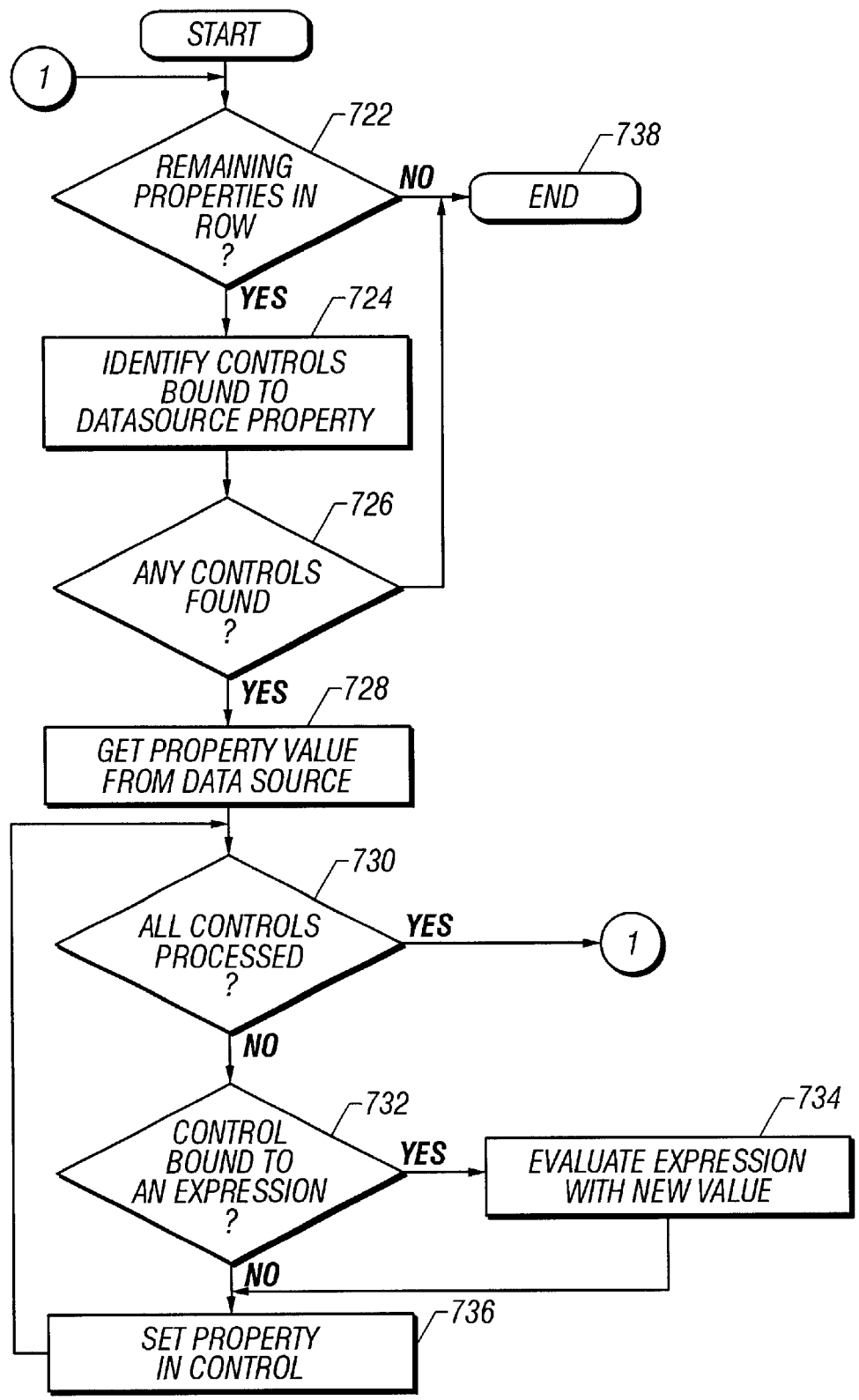
FIG. 7B provides an example of a data source row change process flow according to an embodiment of the invention.

FIG. 7A involves a change to a single property in a data source. When a data source row change occurs, a change effectively occurs to each of the properties, or columns, in the row. Thus, bindings associated with each column in the row are processed. FIG. 7B provides an example of a data source row change process flow according to an embodiment of the invention. At step 722, a determination is made whether there are any properties, or columns, of the row to be processed. If not, processing continues at step 602 in FIG. 6 to await another event. If so, processing continues at step 724.

At step 724, binding manager 306 consults bindings 310 to identify the controls that are bound to the next column in the data source's row. At step 726, a determination is made whether any controls were found. If not, processing continues at step 602 of FIG. 6 to await another event. If so, processing continues at step 728 to get the value for the next column in the data source's row from the data source.

At step 730, a determination is made whether all of the controls bound to the current column have been processed. If so, processing continues at step 722 to process any remaining columns of the data source's row. If not, processing continues at step 732 to determine whether the control that is bound to the column is bound to an expression. If so, processing continues at step 734 to evaluate the expression using the column value in the new row. Processing continues at step 736 to set the result of the expression in the bound control's interface object. If it is determined, at step 732, that the control is not bound to an expression, processing continues at step 736 to set the column value in the new row in the bound control's interface object.

Figure 7C:
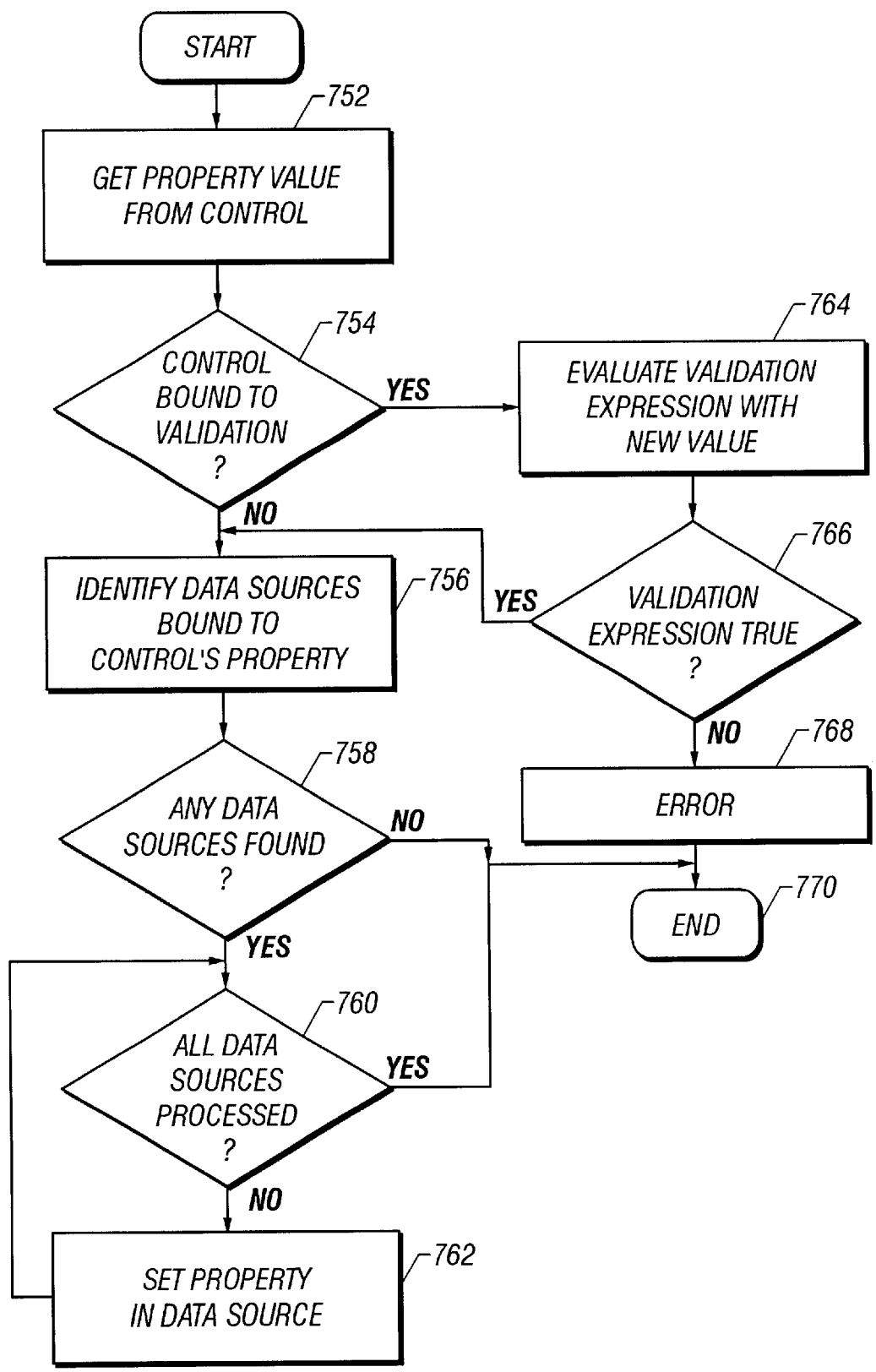
FIG. 7C provides an example of a control property change process flow according to an embodiment of the invention.

A change in the value displayed in a control's interface object results in a property change for the control. FIG. 7C provides an example of a control property change process flow according to an embodiment of the invention.

At step 752, the property value is retrieved from the control by binding manager 306. At step 754, a determination is made whether the data source is bound to a validation expression. If it is determined, at step 754, that the control is bound to a validation expression, processing continues at step 764 to evaluate the validation expression with the new value. At step 766, a determination is made whether the evaluation resulted in a "true" condition (i.e., the new value is valid). If so, processing continues at step 756 to determine whether there are data sources that are bound to the control.

If it is determined, at step 766, that the evaluation resulted in a "false" condition (i.e., the new value is invalid), processing optionally continues at step 768 to generate an error in the application interface and processing returns to step 602 to await another event.

If the control is not bound to a validation or the validation expression returned a "true" result, processing continues at step 756. At step 756, binding manager 306 consults bindings 310 to identify the data sources that are bound to the interface object's control. At step 758, a determination is made whether any data sources were found. If not, processing continues at step 602 of FIG. 6 to await another event. If binding manager 306 identifies one or more data sources bound to the control, processing continues at step 760.

At step 760, a determination is made whether all of the bound data sources have been processed. If so, processing continues at step 602 of FIG. 6 to await another event. If it is determined, at step 760, that not all of the bound data sources have been processed, processing continues at step 762 to set the value from the control in the next data source. Processing continues at step 760 to process any remaining data sources that are bound to the changed property's control.

Query Expression

Binding manager 306 can further synchronize data sources and controls with a queriable data source. In embodiments of the invention, a query expression can be evaluated to generate a result that is incorporated into a query directed to program code that executes the query to retrieve data from a data source. The program code is referred to as a queriable object. An instance of dataSource 308 can be a queriable object, for example. The result that is generated when a query expression is evaluated can be used in the where clause of an SQL select statement, for example. That is, the result can be used as criteria for selecting the information that is retrieved from a data source. The selection criteria can be determined at run time using the query expression mechanism.

The query expression is associated with the queriable object and the control(s) and dataSource(s) that are referenced in the query expression. The following are examples of bind and dependency statements used to register a query expression according to an embodiment of the invention:

bind(queriable object, expression#)

expDependency(expression#, control or dataSource)

The queriable object is bound to an expression using the bind statement. Dependency statements are used to identify the operands (e.g., controls and dataSources) for the expression. Binding manager 306 registers as a listener with the control(s) and/or dataSource(s). Binding manager 306 causes the query expression to be re-evaluated when the operands of the expression change. The result of evaluating the expression is used as criteria in a query to retrieve information from a data source. The query result expression can be used as the sole selection criteria or be appended to existing criteria, for example Master-detail information provides an example of using a query expression to synchronize information. Detail information is relevant to a given master. As the master information changes, it is beneficial for the detail information to change as well. For example, a customer may place several orders. The customer information is the master and the order information associated with a customer is the detail. Order information is associated with a certain customer.

To display customer information, a form interface component (i.e., a customer form) can be designed using design tool 200 which contains interface objects associated with columns in the customer data source. An instance of dataSource 308 (i.e., a customer dataSource) can be used to manage access to the customer data source (e.g., a customers relational DBMS table). Another instance of dataSource 308 (i.e., an orders dataSource) can manage access to an orders data source (e.g., an orders relational DBMS table) that contains order information for customers included in the customer data source.

At run time, when a user requests a different customer for display in the customer form, the customer dataSource notifies binding manager 306 of a row change. The row change is processed as described herein. That is, binding manager causes the new row's column values to be propagated to interface objects in the customer form via their controls.

Binding manager 306 further ensures that the order information remains synchronized with the customer that is currently being displayed in the customer form. That is, binding manager 306 ensures that the new customer's order details are retrieved from the order data source. Binding manager 306 causes a query expression to be re-evaluated to generate a result that can be used to select the new customer's order details from the orders data source.

An instance of dataSource 308, the customer dataSource, has been identified as a operand of a query expression that is bound to an instance of dataSource 308 managing the orders data source (i.e., the order dataSource). The re-evaluated query expression is used to retrieve the order information associated with the customer identified in the new row. The result of the query expression can be an identifier for the new customer, a customerID, for example. Where the orders data source includes a customerID field, for example, the orders that are selected are those whose customerID field is equal to the customerID result of the query expression.

The selection may contain additional criteria (e.g., retrieve only active orders for the new customer). Thus, the re-evaluated query expression is used to query the orders table to retrieve the orders whose customerID field is the same as the customerID field in the new customer row displayed in the form interface component.

The results of the query are retrieved by the orders dataSource. The orders information that is retrieved may be displayed in a sub-form, in a tabular list, or not displayed at all, but instead used for aggregate or other computation, for example.

Selection Binding

The data binding described in conjunction with one or more embodiments of the invention binds interface objects with underlying data in data sources to update one with changes made in the other. In an alternate embodiment, a data binding, referred to as selection binding, binds interface objects with underlying data for the purposes of data selection.

One example of the use of selection binding is query-by-example. For example, in a form interface component, the user indicates that the form should enter query-by-example mode. The form interface component notifies binding manager 306 that the form has entered query-by-example mode. The form contains interface objects in which the user enters values, or partial values. The values entered by the user are not used to update the underlying data. Instead, the values are used to generate selection criteria used in a query that retrieves records from the underlying data.

If selection binding is used to bind a control to a data source, binding manager 306 does not validate a value entered in the control's interface object, or use the value to update the data source. Instead, binding manager 306 stores the value (or list of values). When instructed to execute the query-by-example, binding manager 306 checks each instance of dataSource 308 that is bound to a control of an interface object in which a value was entered to see if it supports query-by-example. If it does, binding manager 306 sends the list of values and their associated columns to the instance of dataSource 308. DataSource 308 can construct a query based on the column values entered by the user.

Embodiment of Software Apparatus for Binding

An embodiment of the invention includes software apparatus comprising a component or collection of components configured to support binding interface objects to data, expression and/or validation. The components may be implemented as instances of object classes in accordance with known object-oriented programming practices, or the components may be implemented under one or more component model definitions. Several component model definitions are currently available, such as COM, CORBA, and the Java™ component scheme referred to as JavaBeans™.

For example, dataSource descriptor 216, design tool 200, control 304, form 302, binding manager 306, and dataSource 308 can be implemented as instances of object classes implemented in an object-oriented programming language. The object class instances can be components that are implemented under one or more component model definitions.

Each component model provides for encapsulation of related functions and data structures into individual components, similar to what occurs under a standard object-oriented programming (OOP) approach. The particular mechanisms by which the components are managed and interact are defined according to the respective component model. Bridges (e.g., ActiveX) may be constructed which allow components designed under different component model definitions to interact within a single application. Interaction is typically performed through a set of methods implemented by the component. These sets of methods are referred to as "interfaces" in some component models. The public methods by which OOP object classes interact are often presented in the form of application programming interface (API) definitions.

To provide a better understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (zero or more instance variables) and zero or more operations (methods) that can use or affect that data. Thus, an object consists of data and zero or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java™ programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects. As previously discussed, the encapsulation provided by objects in an object-oriented programming environment may be extended to the notion of components under a component model definition.

Implementation in the Javat™ Programming Language

An embodiment of the software apparatus of the invention is implemented in the Java™ programming language. The Javat™ programming language is an object-oriented programming language with each program comprising one or more object classes. Unlike many programming languages, in which a program is compiled into machine-dependent, executable program code, Java™ classes are compiled into machine independent bytecode class files. Each class contains code and data in a platform-independent format called the class file format. The computer system acting as the execution vehicle supports the Java™ runtime environment. The runtime environment contains a program called a virtual machine, which is responsible for executing the code in Java™ classes.

Applications may be designed as standalone Java™ applications, or as Java™ "applets" which are identified by an applet tag in an HTML document, and loaded by a browser application. The class files associated with an application or applet may be stored on the local computing system, or on a server accessible over a network. Each class is loaded into the Java™ runtime environment, as needed, by the "class loader."

Java™ classes are loaded on demand from the network (stored on a server), or from a local file system, when first referenced during an application or applet's execution. The runtime environment locates and loads each class file, parses the class file format, allocates memory for the class's various components, and links the class with other already loaded classes. This process makes the code in the class readily executable by the virtual machine.

Java™ classes may also be incorporated into Java™ components referred to as "JavaBeans™". JavaBeans™ are designed in accordance with the JavaBean™ API Specification to allow for component-based application building. Bridges (e.g., ActiveX bridges) may be used with JavaBeans™ to allow JavaBeans™ to be used in other component model environments, such as OLE/COM and CORBA.

Support for features such as "introspection," "customization," "events," "properties" and "persistence" is provided within the JavaBean™ framework to facilitate application building and component use. "Introspection" permits builder tools to analyze how a particular bean works. "Customization" permits an application builder to customize the appearance and behavior of a bean. "Events" provide a simple communication metaphor that can be used to connect a bean with other application components or beans. "Properties" are used for bean customization and programmatic use. "Persistence" allows for a bean to have its customized state saved and reloaded later. These features are discussed in the JavaBean™ API Specification, Version 1.01, by Sun Microsystems (1997), which is available on the World Wide Web at the URL, "http://java.sun.com/beans/spec.html", and is incorporated herein by reference.

Embodiments of the software apparatus may be implemented using standard OOP object classes or using components under a known component model definition. For the purposes of the above description, references to components may refer to instances of OOP object classes or components under a known component model.

Thus, a method and apparatus for synchronizing an application's interface and data has been provided in conjunction with one or more specific embodiments. The invention is defined by the claims and their full scope of equivalents.

What is claimed is:

1. A method of synchronizing interface objects of an application's graphical user interface with an underlying data source comprising:

registering a binding manager at runtime with at least one interface object of an application's graphical user interface and at least one data source, said binding manager configured to bi-directionally synchronize said at least one interface object with said at least one data source;

monitoring said at least one interface object and said at least one data source for occurrence of a change event; and propagating said change event to an unchanged one of said at least one interface object and said at least one data source, said propagating comprising:
  obtaining properties of said change event;
  determining if said change event is valid by evaluating said properties of said change event; and
  propagating said properties to said unchanged one of said at least one interface object and said at least one data source if said change event is valid.

2. The method of claim 1, wherein said data source is bound to an underlying data object and said data source comprises a description of said data object.

3. The method of claim 2, wherein said description comprises an Application Programming Interface (API) defining the structure of said data.

4. The method of claim 1, wherein said propagating said change event further comprises evaluating an expression bound to said at least one interface object.

5. The method of claim 1, wherein said registering a binding manager comprises:
  receiving a binding event notification;
  obtaining binding information from said notification;
  storing said binding information; and
  causing said binding manager to register as a listener with any data source and any interface object referenced in said binding information.

6. The method of claim 1, wherein said change event comprises a data source property change.

7. The method of claim 6, wherein said obtaining said properties comprises:
  identifying said interface object bound to said data source property; and
  retrieving property value from said data source.

8. The method of claim 1, wherein said change event comprises a data source row change.

9. The method of claim 8, wherein said obtaining said properties comprises:
  determining all data source properties in said row;
  identifying all interface objects bound to said data source properties; and
  retrieving property value from said data source.

10. The method of claim 1, wherein said change event comprises a display property change.

11. The method of claim 10, wherein said obtaining said properties comprises:
  retrieving the property value from said interface object;
  generating a result of a validation expression with said property value if said interface objects is bound to said validation expression;
  providing error notification if said result of said validation expression is false; and
  identifying data source bound to said interface object.

12. The method of claim 1, wherein said at least one data object and said at least one interface object are further synchronized with at least one queriable object.

13. The method of claim 1, wherein said obtaining said properties comprises generating selection criteria used in a query that retrieves records from said data source.

14. A system comprising:
  an interface component;
  an interface object within said interface component;
  a control object that controls said interface object;
  a data source descriptor associated with a set of data, said data source descriptor comprising an Application Programming Interface (API) defining the structure of said data;
  a form that manages said interface component, wherein said form comprises binding information between said control object and said data source descriptor; and
  a binding manager, wherein said binding information causes said binding manager to invoke a bind operation at run-time in response to a binding event, said binding manager controlling synchronization between said interface object and said data.

15. The system of claim 14, wherein said synchronization comprises:
  a changed one of said interface object and said data notifying said binding manager when an event occurs;
  said binding manager obtaining the properties of said change event;
  said binding manager evaluating said properties of said change event; and
  propagating said properties to said unchanged one of said interface object and said data.

16. A computer program product comprising:
  a computer readable medium having computer program code embodied therein for synchronizing an application's interface and data, said computer program code configured to cause a processor to:
    register a binding manager at runtime with at least one interface object of an application's graphical user interface and at least one data source, said binding manager configured to bi-directionally synchronize said at least one interface object with said at least one data source;
    monitor said at least one interface object and said at least one data source for occurrence of a change event; and
    propagate said change event to an unchanged one of said at least one interface object and said at least one data source, said propagate comprising:
      obtain properties of said change event;
      determine if said change event is valid by evaluating said properties of said chance event; and
      propagate said properties to said unchanged one of said at least one interface object and said at least one data source if said change event is valid.

17. The computer program product of claim 16, wherein said data source is bound to an underlying data object and contains a description of said data object.

18. The computer program product of claim 16, wherein said obtain said properties comprises generating selection criteria used in a query that retrieves records from said data source.

19. The computer program product of claim 17, wherein said description comprises an Application Programming Interface (API) defining the structure of said data.

20. The computer program product of claim 16, wherein said propagate said change event further comprises evaluating an expression bound to said interface object.

21. The computer program product of claim 16, wherein said register a binding manager comprises computer program code configured to cause a processor to:
  receive a binding event notification;
  obtain binding information from said notification;
  storing said binding information; and
  causing said binding manager to register as a listener with any data source and any interface object referenced in said binding information.

22. The computer program product of claim 21, wherein said obtain said properties comprises:

identify said interface object bound to said data source property; and retrieve property value from said data source.

23. The computer program product of claim 16, wherein said change event is a data source property change.

24. The computer program product of claim 23, wherein said obtain said properties comprises:

determine all data source properties in said row;

identify all interface objects bound to said data source properties; and retrieve property value from said data source.

25. The computer program product of claim 16, wherein said change event is a data source row change.

26. The computer program product of claim 25, wherein said obtain said properties comprises:

retrieve the property value from said interface object;

generate a result of a validation expression with said property value if said interface objects is bound to said validation expression;

provide error notification if said result of said validation expression is false; and identify data source bound to said interface object.

27. The computer program product of claim 21, wherein said change event is a display property change.

28. The computer program product of claim 16, wherein said at least one data object and said at least one interface object are further synchronized with at least one queriable object.

\* \* \* \* \*